United States Patent [19]
Matthews

[11] Patent Number: 5,978,157
[45] Date of Patent: Nov. 2, 1999

[54] DIELECTRIC BOOTLACE LENS

[75] Inventor: Edgar Wesley Matthews, Mountain View, Calif.

[73] Assignee: Space Systems/ Loral, Inc., Palo Alto, Calif.

[21] Appl. No.: 09/146,555

[22] Filed: Sep. 3, 1998

[51] Int. Cl.$^6$ .............................. G20B 3/00; G20B 27/10; H01Q 15/08; H01Q 19/06
[52] U.S. Cl. ......................... 359/737; 359/741; 359/619; 359/620; 343/911 R; 343/753; 362/11
[58] Field of Search ................................... 359/619–621, 359/737, 742, 623, 626; 343/753, 785, 909–911 R; 362/11; 385/33–34

[56] References Cited

U.S. PATENT DOCUMENTS

| | | | |
|---|---|---|---|
| 2,547,416 | 4/1951 | Skellett | 343/753 |
| 4,321,604 | 3/1982 | Ajioka | 343/753 |
| 4,571,591 | 2/1986 | Valentino et al. | 343/754 |
| 4,804,970 | 2/1989 | Todd | 343/753 |
| 5,661,499 | 8/1997 | Epshtein et al. | 343/911 R |
| 5,677,796 | 10/1997 | Zimmerman et al. | 359/654 |
| 5,808,806 | 9/1998 | Guhman et al. | 359/654 |

*Primary Examiner*—Georgia Epps
*Assistant Examiner*—David N. Spector
*Attorney, Agent, or Firm*—Perman & Green, LLP

[57] ABSTRACT

A lens is fabricated of an array of parallel rod-shaped dielectric waveguides extending from a generally planar front surface of the array, this front surface constituting a front surface of the lens, to a concave back surface of the array, this back surface constituting a back surface of the lens. The wavguides vary in length, from a maximum length at an outer region of the lens to a minimum length at a central region of the array, to provide the concave back surface. The back lens surface envelops a receptor of radiant energy located at a focus of the lens. This configuration of lens provides an increased spherical angle of impingement of the incident radiation upon the receptor.

19 Claims, 2 Drawing Sheets

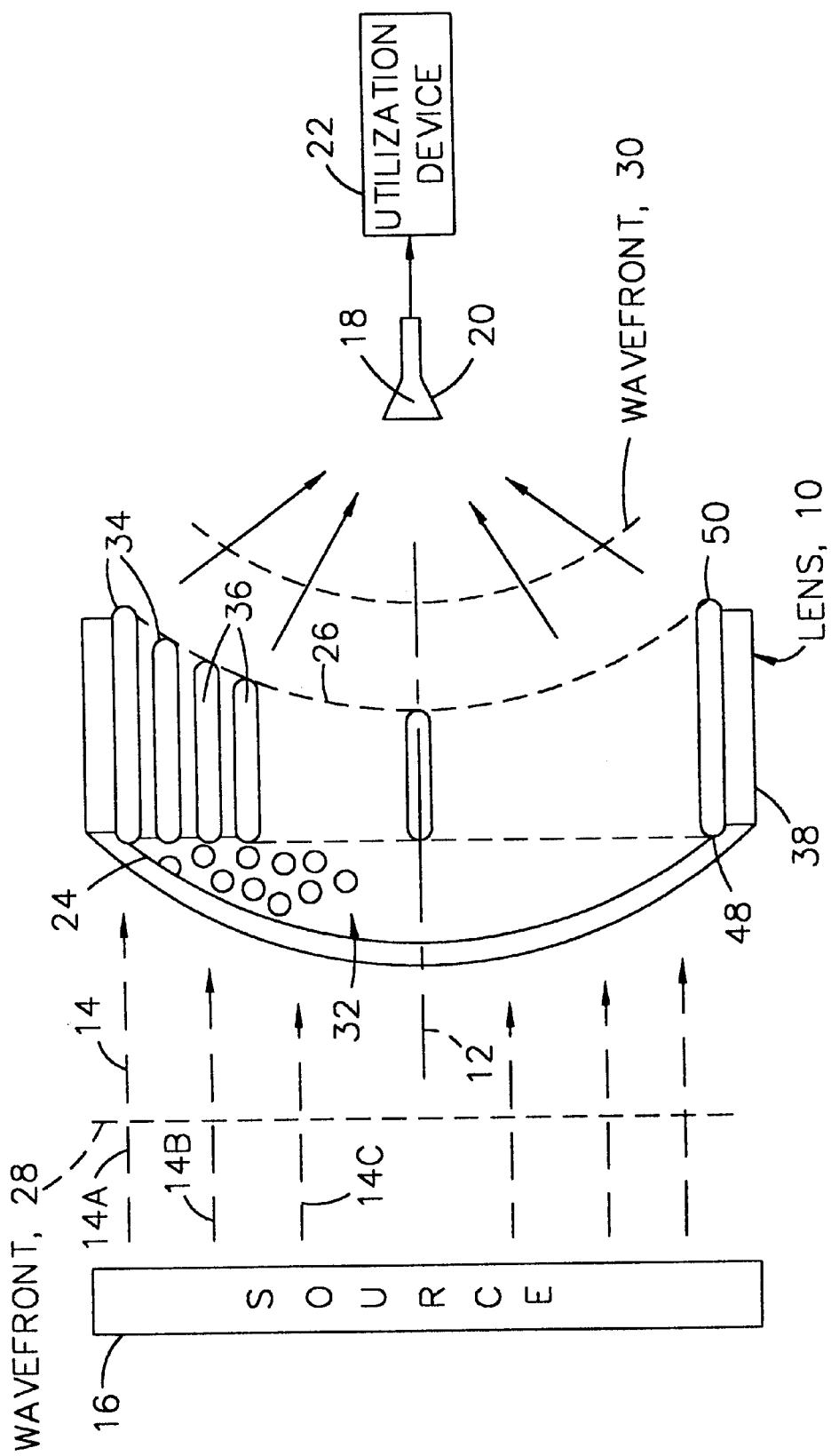

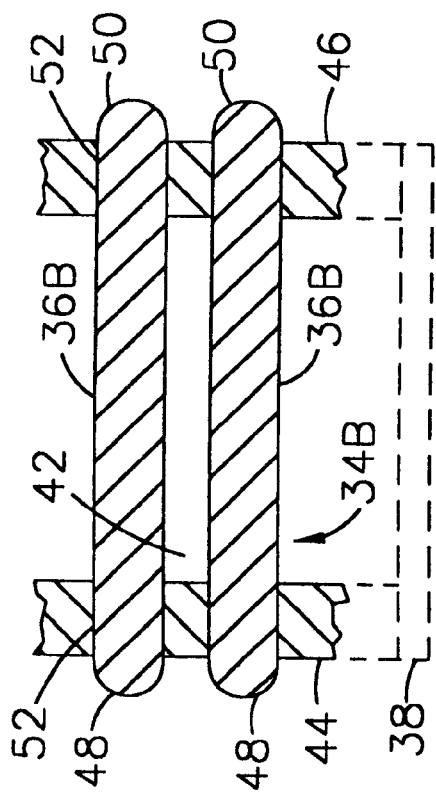
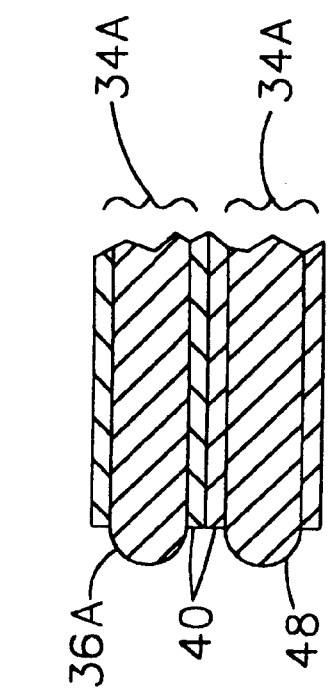
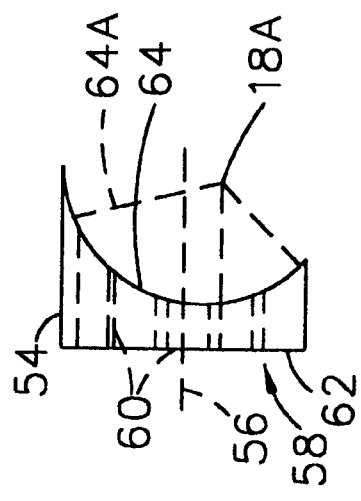
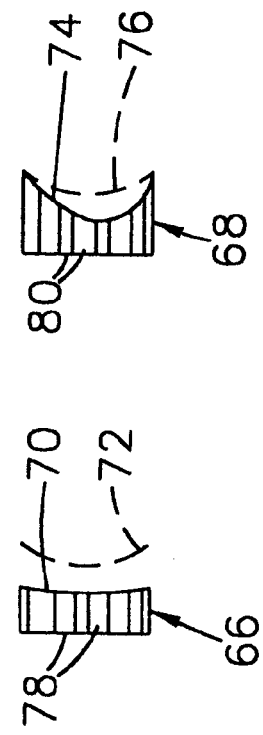
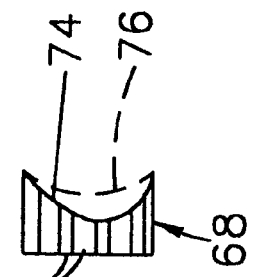

DIELECTRIC BOOTLACE LENS

BACKGROUND OF THE INVENTION

This invention relates to the construction of a lens suitable for use with millimeter wave electromagnetic radiation for focussing an incoming wave upon a feed horn of an antenna and, more particularly, to the construction of the lens of plural dielectrically loaded waveguides.

Lenses are often utilized in optical systems to focus radiant energy upon a detector or a receptor of the radiant energy. The most frequent situation of such focussing of radiant energy is that of optical systems operating in the visible portion of the electromagnetic spectrum, such optical systems including by way of example, a camera and a television vidicon. Such focussing can be done also at infrared frequencies by use of suitable material for construction of the lens, and also at microwave frequencies by use of a material, such as a ceramic, transparent to radiation at the microwave frequencies.

One aspect in the design of a lens is the aperture of the lens which establishes, in terms of a spherical angle of admittance of incident radiation, an amount of radiation that can be captured by the lens and focussed upon the receptor. The aperture is often described in terms of the ratio of lens focal length to lens diameter, a smaller ratio providing for a larger aperture. In terms of the usual mode of construction of a such a lens, the lens has convex optical surfaces, wherein for a collimated beam of incident radiation, the receptor is located behind the lens at a distance equal to the focal length. Increasing the diameter of the lens increases the aperture, but only to the point wherein the aperture size is constrained by limitations of geometric optics and available lens materials of suitably large dielectric constant.

In a system of communication of microwave signals such as millimeter wave microwave signals, of particular interest herein, the microwave signal may propagate through a waveguide having cross-sectional dimensions much greater than the cross-sectional dimensions of a receptor of the microwave signal. A wide aperture lens would be useful in directing the microwave radiation to the receptor to insure that all available radiant power is received. This avoids loss of power which would decrease the available signal-to-noise power ratio and, therefore, impair the quality of signal reception. A problem arises in that available lens construction does not allow for as large a lens aperture as would be desired.

SUMMARY OF THE INVENTION

The aforementioned problem is overcome and other advantages are provided by a lens fabricated of an array of parallel rod-shaped waveguides extending from a generally planar front surface of the array, this front surface constituting a front surface of the lens, to a concave back surface of the array, this back surface constituting a back surface of the lens. The wavguides vary in length, from a maximum length at an outer region of the lens to a minimum length at a central region of the array, to provide the concave back surface which envelops a receptor located at the focus of the lens. This configuration of lens provides an increased spherical angle of impingement of the incident radiation upon the receptor.

In order for the lens to provide for the convergence of rays of radiation from a collimated beam of the radiation, the rays traveling in the outermost waveguides must travel faster than the rays in the central waveguides. This is attained by providing that individual waveguides located at an outer region of the array are loaded with dielectric material of a relatively low dielectric constant and individual waveguides located at a central region of the array are loaded with dielectric material of a relatively high dielectric constant for increased propagation speeds of waves in the outer-region waveguides relative to propagation speeds of waves in the central-region waveguides. Furthermore, in order to attain the speed differential, the outer-region waveguides have larger cross sections than cross sections of the central-region waveguides for increased propagation speeds of waves in the outer-region waveguides relative to propagation speeds of waves in the central-region waveguides.

In a preferred embodiment of the invention, the focal length of the lens is approximately equal to a diameter of the array. Each of the waveguides has a dielectric rod, wherein opposite ends of the rod on respective front and back surfaces of the array have convex surfaces for improved efficiency of reception and transmission of the radiant energy. In one embodiment, individual rods are encased in encircling metallic electrically conductive walls to form the waveguides and to separate signals traveling in respective rods. In a second embodiment, individual rods are encased in encircling electrically insulating walls to form the respective waveguides and to separate signals traveling in respective ones of the rods. The second embodiment is advantageous for providing a reduction in weight and avoidance of inter-element shadowing as compared to a lens of metallic waveguides. Both embodiments provide for reduced transmission loss as compared to lenses of the prior art.

The values of dielectric constant and the cross-sectional dimensions of the various waveguides are selected in accordance with a relationship wherein, in one of the outer-region waveguides a product of the length of the waveguide times the reciprocal of the guide wavelength is equal to the corresponding product for one of the central-region waveguides, and similarly for other ones of the waveguides.

BRIEF DESCRIPTION OF THE DRAWING

The aforementioned aspects and other features of the invention are explained in the following description, taken in connection with the accompanying drawing figures wherein:

FIG. 1 shows a stylized view of a lens constructed in accordance with the invention;

FIG. 2 shows an axial cross-sectional view of a fragment of the lens in accordance with a first embodiment of the invention;

FIG. 3 shows an axial cross-sectional view of a fragment of the lens in accordance with a second embodiment of the invention;

FIG. 4 shows, diagrammatically, a constructing of a lens of the invention with an off-axis focus; and FIGS. 5 and 6 show lenses with surfaces of differing concavity.

Identically labeled elements appearing in different ones of the figures refer to the same element but may not be referenced in the description for all figures.

Detailed Description

With reference to FIG. 1, a lens 10 is constructed about an optic axis 12 for receiving collimated rays 14 of microwave radiation from a radiant source 16, the lens 10 serving to focus the rays 14 upon a focal point 18. The lens 10 is constructed in accordance with a preferred embodiment of the invention wherein the focal point 18 is located on the optic axis 12. However, it is to be understood that the principles of the invention apply also to an optical construction wherein the focal point 18 is offset from the optic axis 12. A receiver of radiant energy, depicted as a horn 20 is located at the focal point 18 for directing received radiant energy to a utilization device 22 which may include a filter or detector (not shown), by way of example. A front surface 24 of the lens 10 has a planar form, and a back surface 26 of the lens 10 has a spherical surface in the preferred embodiment of the invention, it being understood that the principles of the invention apply also to lenses having other shapes of front and back surfaces. An incoming planar wavefront 28 is shown incident upon the front surface 24, and an outgoing spherical wavefront 30 produced by the lens 10 propagates toward the focal point 18 at the horn 20.

The lens 10 comprises an array 32 of transmission lines, or waveguides 34. Each of the waveguides 34 comprises an elongated rod 36 of material transparent to the microwave radiation, and extends from the front surface 24 to the back surface 26. Preferably, the rod 36 has a cylindrical shape resulting in uniform cross-sectional dimensions throughout the rod. By way of example, a rod 36 may have a circular cross section or a square cross section, the shape of the cross section being selected as may be convenient in constructing a lens of specific configuration. Suitable materials for construction of the rods 36 are dielectrics, such as metallic oxides including quartz, alumina and beryllia. The waveguides 34 are parallel to the optic axis 12, and are spaced apart from each other for optical isolation of the microwave radiation propagating in respective ones of the waveguides 34. The waveguides 34 are held in position by an encircling frame 38 of the lens 10. In accordance with a first embodiment for the invention depicted in the fragmentary view of FIG. 2, each of waveguides 34A comprises a cylindrical jacket 40 of electrically conducting material, preferably a metal such as copper or aluminum, which encloses the rod 36A and isolates microwave signals in adjacent ones of the rods 36A from each other.

Alternatively, in accordance with a second embodiment for the invention depicted in the fragmentary view of FIG. 3, in each of waveguides 34B, rod 36B is surrounded by electrically insulating material 42 of low dielectric constant, such as a ceramic or simply air, the embodiment with air being illustrated in FIG. 3. The insulating material 42 isolates microwave signals in adjacent ones of the rods 36B from each other. In the embodiment of FIG. 3, a front plate 44 and a back plate 46 support the rods 36B. The plates 44 and 46 are fabricated of electrically insulating ceramic of low dielectric constant, and connect with the frame 38. The connection of the plates 44 and 46 to the frame 38 is indicated diagrammatically in FIG. 3.

Each of the rods 30 (FIG. 1), 36A (FIG. 2), and 36B (FIG. 3) has a front convex end surface 48 and a back convex end surface 50, both of the end surfaces 48 and 50 being rounded, particularly with a conical shape in the preferred embodiment of the invention. In the preferred embodiment of the invention, the incoming wavefront 28 propagates in an air environment between the source 16 and the lens 10, and the outgoing wavefront 30 propagates in an air environment between the lens 10 and the horn 20. The rounding of the end surfaces 48 and 50 enhances coupling of radiant energy between each of the dielectric waveguides 34 and the air environment. In FIG. 3, the rods 36B are supported within apertures 52 of the plates 44 and 46, wherein the front end surfaces 48 protrude forward of the front plate 44, and the back end surfaces 50 protrude behind the back plate 46.

In order to convert the plane wavefront 28 to the spherical wavefront 30, the propagation of radiant energy via an outside ray 14A must be at a speed which is greater than the propagation speed of an inner ray 14B which, in turn, is greater than the propagation speed of a ray 14C passing through a central region of the lens 10. This establishes the requisite cophasal relationship among wavelets outputted by each of the waveguides, whereby the wavelets combine to produce the spherical wavefront. The difference in propagation speeds is accomplished by constructing the waveguides 34 of different cross-sectional dimensions and with dielectric materials of different dielectric constants. The cross-sectional dimensions and the dielectric constants establish guide wavelengths within respective ones of the waveguides 34.

In order to attain the foregoing cophasal relationship among the wavelets outputted by respective ones of the waveguides 34 at the spherical back surface 26 of the lens 10, the parameters of dielectric constant and cross-sectional dimensions of respective ones of the waveguides 34 are selected as follows. There is a well-known relationship between guide wavelength and the parameters of dielectric constant and cross-sectional dimensions of a waveguide. Thereby, a desired value of guide wavelength can be attained by selection of the dielectric constant and the cross-sectional dimensions. The values of dielectric constant and the cross-sectional dimensions of the various waveguides are selected in accordance with a relationship wherein, in one of the outer-region waveguides a product of the length of the waveguide times the reciprocal of the guide wavelength is equal to the corresponding product for one of the central-region waveguides, and similarly for other ones of the waveguides. This relationship produces cophasal wavelets at the back end surfaces 50 of the respective waveguides 34 which combine to produce the outgoing wavefront 30.

In the foregoing construction of the array 32 of waveguides 34, the dielectric material of individual ones of the waveguides 34 located at the outer region of the array, such as those in the vicinity of the ray 14A, has a lower dielectric constant than the material of individual ones of the waveguides 34 located at a central region of the array, such as those in the vicinity of the ray 14C. Also, the waveguides 34 of the outer region have larger cross sections than cross sections of the waveguides 34 of the central-region. The low dielectric-constant material and the large cross section of the outer waveguides, as compared to the higher dielectric-constant material and the smaller cross section of the central waveguides results in increased propagation speeds of waves in the outer-region waveguides relative to propagation speeds of waves in the central-region waveguides.

The foregoing construction is useful for transmission and for focusing millimeter wave radiation including radiation in the range of 60–100 GHz (gigahertz). In the outermost one of the waveguides 34, a typical value of cross-sectional radius is 0.15 centimeter, and a typical value of dielectric constant is 4. For a central waveguide on the axis 12 of the array 32, a typical value of cross-sectional radius is 0.10 centimeter, and a typical value of dielectric constant is in the range of 9–10.

In a further embodiment of the invention shown in FIG. 4, a lens 54 has an optic axis 56, and is constructed of an array 58 of dielectric waveguides 60 in a manner similar to the construction of the lens 10 of FIGS. 1–3. In FIG. 4, front end surfaces of the waveguides 60 terminate on a planar front surface 62 of the lens 54. Back end surfaces of the waveguides 60 terminate on a concave back surface 64 of the lens 54. The concave surface 64 has a spherical shape centered on an off-axis focal point 18A. As shown in FIG. 4, the focal point 18A is offset from the axis 56, and rays 64A emanating from the back surface 64 converge on the focal point 18A. The dielectric constants of the material of the respective waveguides 60 and the cross-sectional dimensions of the respective waveguides 60 are selected, analogously to the manner described above, to provide the cophasal relationship among the wavelets emanating from the back ends of the respective waveguides 60, this resulting in a spherical wavefront converging on the focal point 18A.

By way of alternative embodiments of the invention, it is noted that the back surfaces 26 and 64, respectively, of the lenses 10 and 54 have been constructed as spherical surfaces in the embodiments of FIGS. 1 and 4 to generate the spherical wavefronts which converge upon the foci 18 and 18A, respectively. The respective ones of the waveguides 34, 60 have been constructed in each of the foregoing embodiments to introduce the requisite phase shift to develop the cophasal relationship among signals exiting the back ends of the waveguides 34, 60 at the spherical back lens surfaces 26, 64. However, it is possible also to construct lenses 66 and 68, as shown in FIGS. 5 and 6, respectively, wherein the back surface 70 (FIG. 5) has insufficient concavity to form a desired spherical wavefront 72, and wherein the back surface 74 (FIG. 6) has excessive concavity to form a desired spherical wavefront 76. The principles of the invention are applied to construct the embodiments of FIGS. 5 and 6 as follows.

In the embodiment of FIG. 5, outer ones of waveguides 78 of the lens 66 are provided with still lower dielectric constants and/or larger cross sections, than described above for the lens 10, to speed up the wave propagating through the outer ones of the waveguides 68 of the lens 66 to produce the desired spherical wavefront 72. Alternatively, in the embodiment of FIG. 5, central ones of waveguides 78 of the lens 66 are provided with still higher dielectric constants and/or smaller cross sections, than described above for the lens 10, to slow down the wave propagating through the central ones of the waveguides 68 of the lens 66 to produce the desired spherical wavefront 72.

In the embodiment of FIG. 6, outer ones of waveguides 80 of the lens 68 are provided with higher dielectric constants and/or smaller cross sections, than described above for the lens 10, to slow down the wave propagating through the outer ones of the waveguides 80 of the lens 68 to produce the desired spherical wavefront 76. Alternatively, in the embodiment of FIG. 6, central ones of waveguides 80 of the lens 68 are provided with dielectric constants and/or larger cross sections, than described above for the lens 10, to speed up the wave propagating through the central ones of the waveguides 80 of the lens 68 to produce the desired spherical wavefront 76. The principles of construction of lens with on-axis focus, as disclosed in FIGS. 5 and 6, also apply in analogous manner to the construction of an off-axis lens, similar to that of the lens 54 of FIG. 4 wherein there is insufficient or excessive concavity of the back lens surface.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A lens suitable for focussing radiation to a receptor of radiation, comprising:
a plurality of waveguides arranged side by side in an array and extending parallel to an axis of said array, said waveguides extending from a front surface of said array to a back surface of said array; and
wherein one of said front and said back surfaces is concave.

2. A lens according to claim 1 wherein said array of waveguides focuses a beam of radiation to a focal point, wherein, upon a positioning of said lens relative to said receptor, said receptor is located at said focal point.

3. A lens according to claim 2 wherein individual ones of said waveguides located at an outer region of said array are loaded with dielectric material of a relatively low dielectric constant and individual ones of said waveguides located at a central region of said array are loaded with dielectric material of a relatively high dielectric constant for increased propagation speeds of waves in said outer-region waveguides relative to propagation speeds of waves in said central-region waveguides.

4. A lens according to claim 3 wherein said back surface is concave, and individual ones of said waveguides located at an outer region of said array are longer than individual ones of said waveguides located at a central region of said array for guiding rays of radiation to said focal point.

5. A lens according to claim 3 wherein said outer-region waveguides have larger cross sections than cross sections of said central-region waveguides for increased propagation speeds of waves in said outer-region waveguides relative to propagation speeds of waves in said central-region waveguides.

6. A lens according to claim 5 wherein said back surface is concave, individual ones of said waveguides located at an outer region of said array are longer than individual ones of said waveguides located at a central region of said array for guiding rays of radiation to said focal point, and a focal length of said lens is approximately equal to a diameter of said array for increased spherical viewing angle of the receptor upon a placing of the receptor at said focal point.

7. A lens according to claim 6 wherein each of said plurality of waveguides comprises a rod of dielectric material.

8. A lens according to claim 7 wherein said array has a circular cross section, and each of said rods are circular in cross section.

9. A lens according to claim 7 wherein said array has a square cross section, and each of said rods are square in cross section.

10. A lens according to claim 7 wherein said array has a hexagonal cross section, and each of said rods are hexagonal in cross section.

11. A lens according to claim 7 wherein, in each of said rods, an end of said rod at said back surface of said array has a concave surface for improved efficiency of radiating towards said focal point.

12. A lens according to claim 7 wherein, in each of said rods, an end of said rod at said front surface of said array has a concave surface for improved efficiency of collecting radiation impinging on the front surface of said array.

13. A lens according to claim 7 wherein, in each of said plurality of waveguides, said rod is enclosed by an electrically conductive material.

14. A lens according to claim 13 wherein said electrically conductive material is a metal.

15. A lens according to claim 7 wherein, in said array of waveguides, individual ones of said rods are separated from adjacent ones of said rods by electrically insulating material.

16. A lens according to claim 15 wherein said electrically insulating material is air.

17. A lens according to claim 2 wherein said concave surface faces said focal point, said focal point being on said axis.

18. A lens according to claim 2 wherein said concave surface faces said focal point, said focal point being displaced from said axis.

19. A lens according to claim 3 wherein said back surface is concave, and individual ones of said waveguides located at an outer region of said array are longer than individual ones of said waveguides located at a central region of said array for guiding rays of radiation to said focal point;

said outer-region waveguides have larger cross sections than cross sections of said central-region waveguides for increased propagation speeds of waves in said outer-region waveguides relative to propagation speeds of waves in said central-region waveguides; and in one of said outer-region waveguides a product of the length of said waveguide times the reciprocal of the guide wavelength is equal to the corresponding product for one of said central-region waveguides.

\* \* \* \* \*